United States Patent
Usikov

(10) Patent No.: US 9,552,531 B2
(45) Date of Patent: Jan. 24, 2017

(54) FAST COLOR-BRIGHTNESS-BASED METHODS FOR IMAGE SEGMENTATION

(71) Applicant: SONY CORPORATION, Tokyo (JP)

(72) Inventor: Daniel Usikov, Newark, CA (US)

(73) Assignee: Sony Corporation, Tokyo (JP)

( * ) Notice: Subject to any disclaimer, the term of this patent is extended or adjusted under 35 U.S.C. 154(b) by 148 days.

(21) Appl. No.: 14/610,630

(22) Filed: Jan. 30, 2015

(65) Prior Publication Data
US 2016/0224859 A1 Aug. 4, 2016

(51) Int. Cl.
*G06K 9/46* (2006.01)
*G06K 9/52* (2006.01)
*G06K 9/62* (2006.01)
*G06T 7/00* (2006.01)

(52) U.S. Cl.
CPC .......... *G06K 9/4652* (2013.01); *G06K 9/4661* (2013.01); *G06K 9/52* (2013.01); *G06K 9/6267* (2013.01); *G06T 7/0081* (2013.01); *G06T 2207/10024* (2013.01)

(58) Field of Classification Search
CPC .... G06T 7/0081; G06T 7/0087; G06T 7/0093; G06T 2207/10024; G06T 2207/10028; G06T 2207/20144; G06T 7/408; G06K 9/4652; G06K 9/342
See application file for complete search history.

(56) References Cited

U.S. PATENT DOCUMENTS

| | | | |
|---|---|---|---|
| 6,535,637 B1 * | 3/2003 | Wootton | B65B 57/00 382/190 |
| 7,978,938 B1 | 7/2011 | Wilensky | |
| 8,295,594 B2 | 10/2012 | Brown Elliott et al. | |
| 8,594,426 B2 | 11/2013 | Bryant et al. | |
| 2013/0156315 A1 | 6/2013 | Friedhoff et al. | |
| 2014/0037198 A1 * | 2/2014 | Larlus-Larrondo | G06T 7/0081 382/159 |

FOREIGN PATENT DOCUMENTS

WO 2004061768 A1 7/2004
WO 2013144809 A2 10/2013

OTHER PUBLICATIONS

Daniel Sykora, Computer Assisted Analysis of Classical Cartoon Animations, Czech Technical University in Prague Faculty of Electrical Engineering Department of Computer Science and Engineering, Sep. 2006.

* cited by examiner

*Primary Examiner* — Duy M Dang
(74) *Attorney, Agent, or Firm* — Haverstock & Owens LLP

(57) ABSTRACT

Image segmentation utilizing the color and brightness of sections of the image to generate super-pixels is described herein. The image segmentation is implemented pixel-wise. A color triangle is utilized in the classification of the pixels. By using a hierarchical classification table, the memory usage is significantly reduced, and the image segmentation is able to be performed on-the-fly in real-time.

21 Claims, 4 Drawing Sheets

Color triangle

Color sectors in 3-division scheme

Plane of the color triangle in the color cube

FAST COLOR-BRIGHTNESS-BASED METHODS FOR IMAGE SEGMENTATION

FIELD OF THE INVENTION

The present invention relates to image processing. More specifically, the present invention relates to image segmentation.

BACKGROUND OF THE INVENTION

Image segmentation is the process of partitioning a digital image into multiple segments. The goal of segmentation is to simplify or change the representation of an image into something that is easier to analyze.

SUMMARY OF THE INVENTION

Image segmentation utilizing the color and brightness of sections of the image to generate super-pixels is described herein. The image segmentation is implemented pixel-wise. A color triangle is utilized in the classification of the pixels. By using a hierarchical classification table, the memory usage is significantly reduced, and the image segmentation is able to be performed on-the-fly in real-time.

In one aspect, a method programmed in a non-transitory memory of a device comprises acquiring an image and performing image segmentation on the image in a color space and brightness space simultaneously. The image segmentation is performed using a pixel-wise implementation. Performing image segmentation utilizes color and brightness of pixels of the image to generate superpixels. Performing image segmentation includes classifying gray-level pixels as belonging to a gray-level category, and subdividing remaining pixels into sub-categories by using a color triangle which is divided into sectors. The color triangle includes 9 divisions, 36 divisions or 15 divisions, and the color triangle is adjusted to human color perception. A first subset of the sectors are labeled by brightness and a second subset of sectors are labeled by average color and brightness. Performing image segmentation includes classifying pixels by comparing a color vector of a pixel with classification information to place each pixel in a classification. The comparison is performed using a hierarchical classification table.

In another aspect, a system comprises an acquiring device configured for acquiring an image and a processing device configured for performing image segmentation on the image in a color space and brightness space simultaneously. The image segmentation is performed using a pixel-wise implementation. Performing image segmentation utilizes color and brightness of pixels of the image to generate superpixels. Performing image segmentation includes classifying gray-level pixels as belonging to a gray-level category, and subdividing remaining pixels into sub-categories by using a color triangle which is divided into sectors. The color triangle includes 9 divisions, 36 divisions or 15 divisions, and the color triangle is adjusted to human color perception. A first subset of the sectors are labeled by brightness and a second subset of sectors are labeled by average color and brightness. Performing image segmentation includes classifying pixels by comparing a color vector of a pixel with classification information to place each pixel in a classification. The comparison is performed using a hierarchical classification table.

In another aspect, an apparatus comprises an acquisition device for acquiring an image, a non-transitory memory for storing an application, the application for performing image segmentation on the image in a color space and brightness space simultaneously and a processing component coupled to the memory, the processing component configured for processing the application. The image segmentation is performed using a pixel-wise implementation. Performing image segmentation utilizes color and brightness of pixels of the image to generate superpixels. Performing image segmentation includes classifying gray-level pixels as belonging to a gray-level category, and subdividing remaining pixels into sub-categories by using a color triangle which is divided into sectors. The color triangle includes 9 divisions, 36 divisions or 15 divisions, and the color triangle is adjusted to human color perception. A first subset of the sectors are labeled by brightness and a second subset of sectors are labeled by average color and brightness. Performing image segmentation includes classifying pixels by comparing a color vector of a pixel with classification information to place each pixel in a classification. The comparison is performed using a hierarchical classification table.

DETAILED DESCRIPTION OF THE PREFERRED EMBODIMENT

Image segmentation is the first step in the automated image understanding procedure. The segmentation represents an image as a collection of super-pixels. Each super-pixel is labeled by its distinctive property as it was calculated by the respective segmentation method. Each segmentation method specializes on specific set of features, such as distinct colors, brightness, or smoothness, texture, or any other feature. Usually the segmentation methods belong to one of two classes: area-based and boundary-based. Area-based segmentation methods divide the image into super-pixels, each pixel in the same super-pixel has similar properties, for example, almost the same brightness. The boundary-based segmentation methods find lines in the image where the image experiences a sharp change, for example, a significant drop in brightness. Often, the area-based segmentation provides the boundary segmentation as by-product, where the border lines are the exterior contours of segmented super-pixels.

Among all segmentation methods, the color-based and brightness-based segmentations are the most often used. Recently, the computational speed of the algorithm became a very demanding feature because the segmentation method is used for real-time image applications, such as tracing objects in dynamic scenes in real-time.

To perform the image segmentation, the method described herein simultaneously uses color and brightness properties of pixels. It is a pixel-wise method, e.g. it works individually with each pixel in the image. The method explores an observation that human eyes recognize colors better at high brightness. If some areas of the image are dark, then the color estimation is not reliable. In that area, the method should tell that the pixels have "dark" property. But there are cases when the pixel is bright but has approximately the same brightness in each R,G,B color channel. In that case, the pixel would be characterized as being "bright" without specification of the color. In general, the gray-level pixel (dark, bright, or with intermediate brightness) should be classified as belonging to the gray-level category and be attached to a sub-category label, such as "dark," "gray," or "bright".

The remaining pixels, belonging to a category "color" (e.g., where the color is well pronounced), are subdivided into sub-categories, by dividing the "color triangle" into some number of sectors.

The color triangle is a cross-section of the "color cube." Each pixel with brightness R,G,B has the corresponding position in the cube. The brightness in each color channel varies within (0:1) interval.

Figure 1:
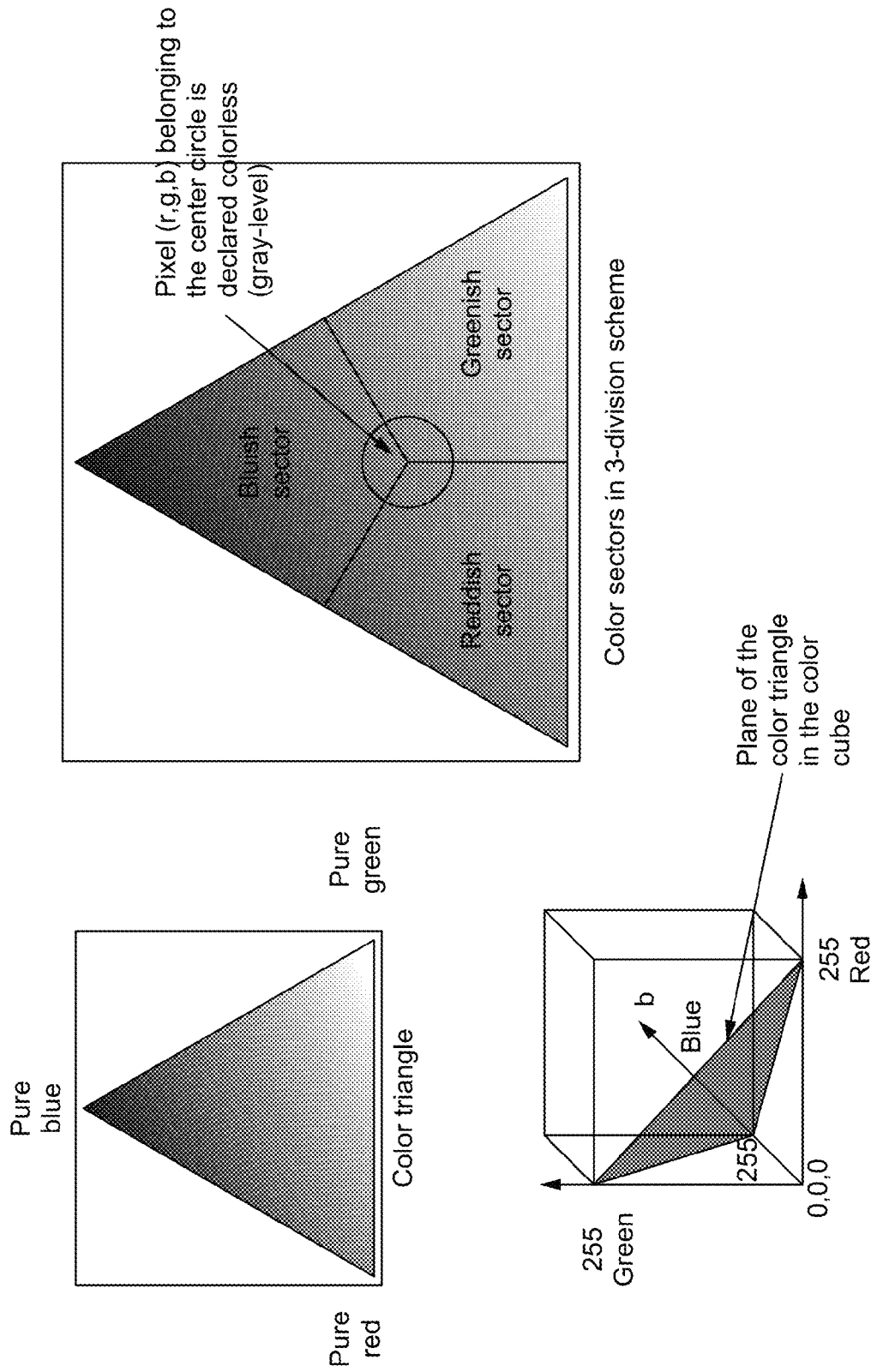
FIG. 1 illustrates an exemplary color triangle according to some embodiments.

The color triangle is a plane in the color cube defined by the 3 points: (1,0,0),(0,1,0),(0,0,1), or by the equation r+g+b=1. Arbitrary color (r,g,b) in the cube is projected from the color cube on this plane, that represents the maximal brightness available for this color. A color triangle is shown in FIG. 1. To find to which color sector a pixel (r,g,b) belongs, max(r,g,b) is found. For example, if r=max(r,g,b), then the pixel belongs to the reddish sector.

The method provides image segmentation simultaneously in the color and in the brightness spaces. The method utilizes a "facetious" subdivision of the color cube into a small number of sectors, usually between 8 and 15. Some sectors are labeled by their average brightness (such as "dark" or "bright"), and some sectors are labeled by their average color and brightness (such as "dark bluish" or "bright bluish"). The sectors are organized in such a way that they reflect a human's perception of colors and brightness. A special effort is taken to make the conversion of the pixel's color vector (r,g,b) into the sector's classification label. In general, a look-up-table is able to be pre-calculated, converting 256*256*256 colors into the classification label. But the table uses a significant amount of computer memory, about 16.8 Mbytes. The labeling is able to be conducted "on-the-fly" because the color cube has been divided into sectors that are able to be found by simple formulas directly from (r,g,b) values. Also, because the sectors are symmetrically located in the color triangle, the hierarchical classification table is able to be used, thus reducing the memory usage to approximately 1 Kbyte.

The complexity of the segmentation method is proportional to the number of pixels in the image, because it is conducted in the "pixel-wise" manner. The calculations are able to be highly parallelized, up to the number of pixels in the image. Since the calculations are able to be parallelized, parallel processors are able to be implemented. The image is subdivided into sectors which number is equal to the number of available processors.

In some embodiments, the color sectors are chosen in such a way that the human face, which normally has a reddish hue, fits completely into the "reddish" sector in the color triangle. As a result, the segmentation is suitable for finding faces in the image.

Figure 2:
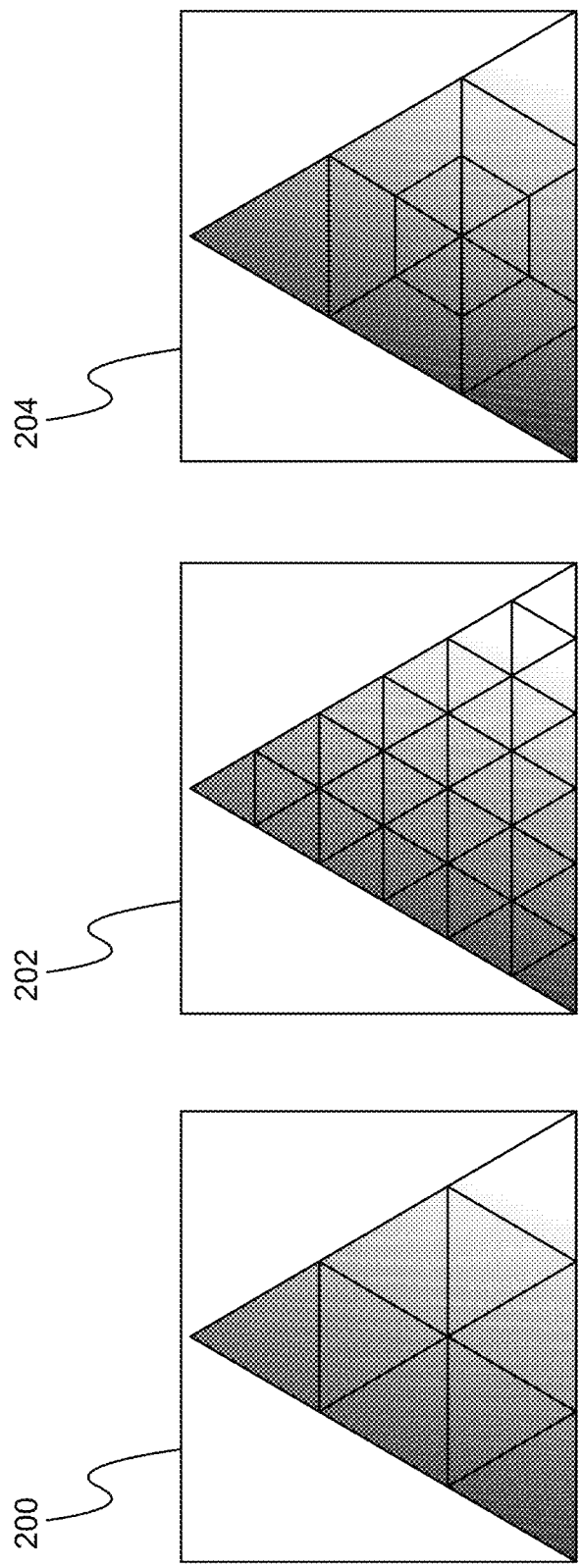
FIG. 2 illustrates exemplary different divisions of a color triangle according to some embodiments.

FIG. 2 illustrates exemplary different divisions of a color triangle according to some embodiments. Color triangle 200 has 9 divisions. Color triangle 200 provides more detailed color segmentation than the 3-color scheme. Color triangle 202 has 36 divisions. Color triangle 202 has four times more detailed color segmentation than the 9-division scheme. Color triangle 204 has 15 divisions. Color triangle 204 contains fewer color divisions than the 36-division scheme, but is more adjusted to the human color perception. Specifically, the near-to-pure colors at 4-divisions near the vertexes of the 36-division color triangle are grouped in a single cluster to reflect the fact that color perception are almost constant across that area. All schemes of divisions maintain the symmetry with respect to the 120 degree rotations of the color triangle about its center. The symmetry is able to be used for the fast computations.

Figure 3:
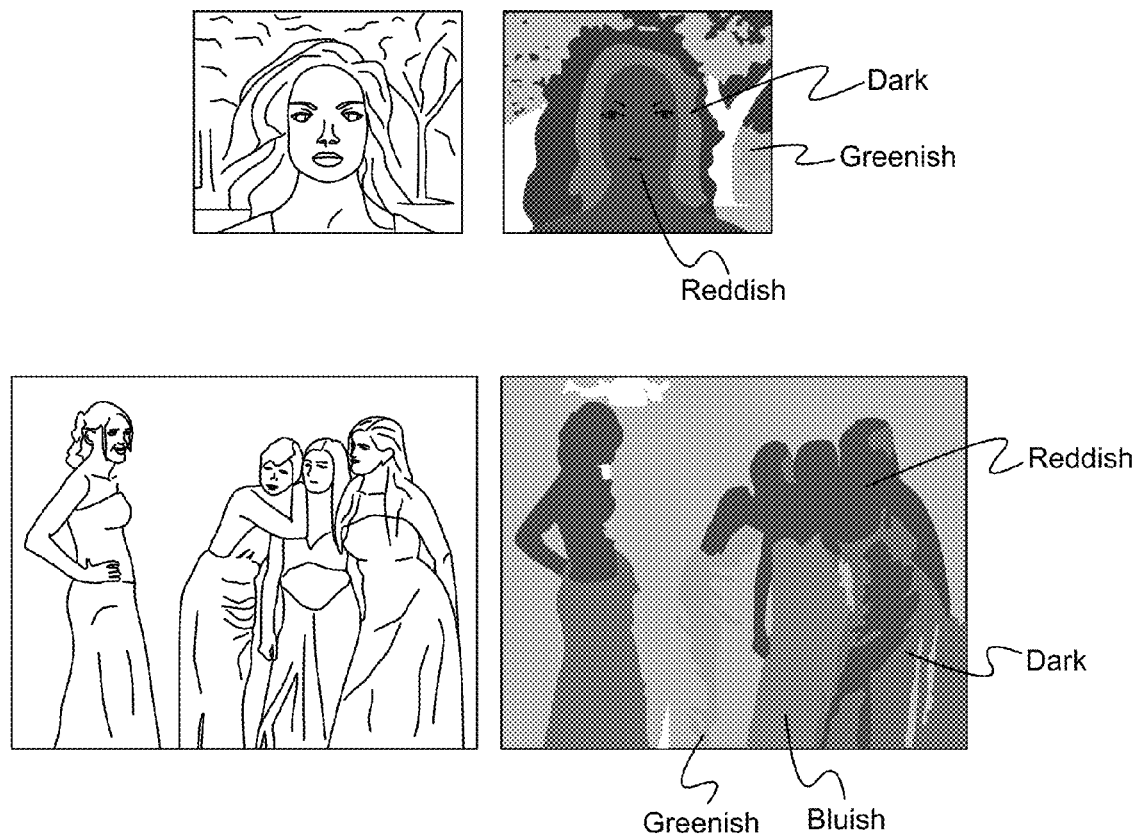
FIG. 3 illustrates exemplary segmentations by the 3-division scheme according to some embodiments.

FIG. 3 illustrates exemplary segmentations by the 3-division scheme according to some embodiments. The reddish sector of the segmentation suits well for identifying possible locations of human faces.

Figure 4:
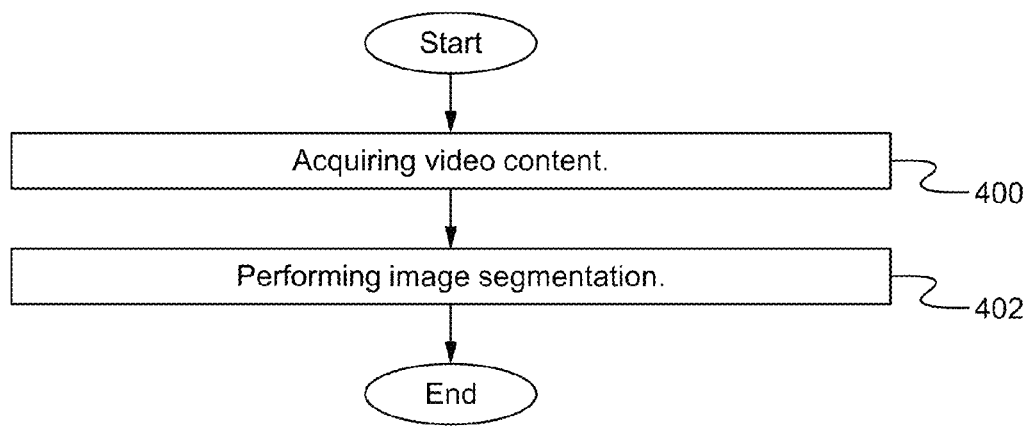
FIG. 4 illustrates a flowchart of a method of image segmentation according to some embodiments.

FIG. 4 illustrates a flowchart of a method of image segmentation according to some embodiments. In the step 400, an image is acquired. For example, an image is captured using a camera, or an image is received on a computing device such as a smart phone. In the step 402, image segmentation is performed on the image. The image segmentation utilizes the color and brightness of sections (e.g., pixels) of the image to generate groups of pixels (e.g., super-pixels). In some embodiments, the image segmentation is implemented pixel-wise, such that each pixel of the image is individually analyzed. In some embodiments, gray-level pixels are classified as belonging to a gray-level category, and the remaining pixels, belonging to a category "color," are subdivided into sub-categories by using a "color triangle" which is divided into sectors. Some sectors are labeled by their brightness such as "dark" or "bright" and some sectors are labeled by their average color and brightness such as "dark bluish" or "bright bluish." The pixels are classified by comparing the pixel's color vector (r,g,b) with classification information to place each pixel in a classification. In some embodiments, the comparison is performed using a look-up table or a hierarchical classification table. In some embodiments, additional or fewer steps are implemented. In some embodiments, the order of the steps is modified.

Figure 5:
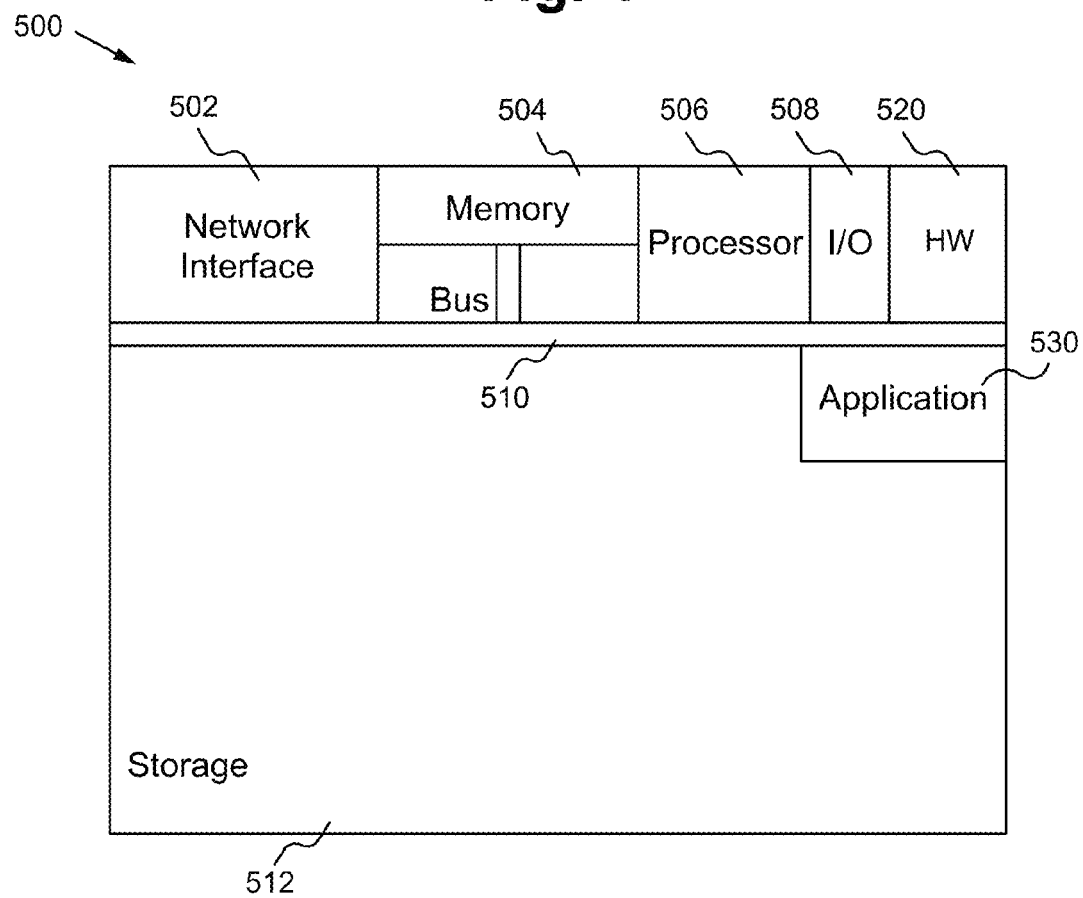
FIG. 5 illustrates a block diagram of an exemplary computing device configured to implement the image segmentation method according to some embodiments.

FIG. 5 illustrates a block diagram of an exemplary computing device configured to implement the image segmentation method according to some embodiments. The computing device 500 is able to be used to acquire, store, compute, process, communicate and/or display information such as images and videos. In general, a hardware structure suitable for implementing the computing device 500 includes a network interface 502, a memory 504, a processor 506, I/O device(s) 508, a bus 510 and a storage device 512. The choice of processor is not critical as long as a suitable processor with sufficient speed is chosen. The memory 504 is able to be any conventional computer memory known in the art. The storage device 512 is able to include a hard drive, CDROM, CDRW, DVD, DVDRW, High Definition disc/drive, ultra-HD drive, flash memory card or any other storage device. The computing device 500 is able to include one or more network interfaces 502. An example of a network interface includes a network card connected to an Ethernet or other type of LAN. The I/O device(s) 508 are able to include one or more of the following: keyboard, mouse, monitor, screen, printer, modem, touchscreen, button interface and other devices. Image segmentation method application(s) 530 used to implement the image segmentation method are likely to be stored in the storage device 512 and memory 504 and processed as applications are typically processed. More or fewer components shown in FIG. 5 are able to be included in the computing device 500. In some embodiments, image segmentation method hardware 520 is included. Although the computing device 500 in FIG. 5 includes applications 530 and hardware 520 for the image segmentation method, the image segmentation method is able to be implemented on a computing device in hardware, firmware, software or any combination thereof. For example, in some embodiments, the image segmentation method applications 530 are programmed in a memory and executed using a processor. In another example, in some embodiments, the image segmentation method hardware 520 is programmed hardware logic including gates specifically designed to implement the image segmentation method.

In some embodiments, the image segmentation method application(s) 530 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, smart jewelry (e.g., smart watch) or any other suitable computing device.

To utilize the image segmentation method described herein, a device such as a digital camera/camcorder is used to acquire image/video content. The image segmentation method is automatically used to enable analysis of the image such as object/face detection. The image segmentation method is able to be implemented automatically without user involvement.

In operation, the image segmentation method is able to be used as an image processing software application, suitable for the use in smart phones, notebooks, computers, game consoles and a portion of the image processing packet, for example. In some embodiments, the image segmentation method is combined with scene analysis, automated object-of-interest finding and inpainting methods.

Some Embodiments of Fast Color-Brightness-Based Methods for Image Segmentation

1. A method programmed in a non-transitory memory of a device comprising:
   a. acquiring an image; and
   b. performing image segmentation on the image in a color space and brightness space simultaneously.
2. The method of clause 1 wherein the image segmentation is performed using a pixel-wise implementation.
3. The method of clause 1 wherein performing image segmentation utilizes color and brightness of pixels of the image to generate superpixels.
4. The method of clause 1 wherein performing image segmentation includes classifying gray-level pixels as belonging to a gray-level category, and subdividing remaining pixels into sub-categories by using a color triangle which is divided into sectors.
5. The method of clause 4 wherein the color triangle includes 9 divisions, 36 divisions or 15 divisions, and the color triangle is adjusted to human color perception.
6. The method of clause 1 wherein a first subset of the sectors are labeled by brightness and a second subset of sectors are labeled by average color and brightness.
7. The method of clause 1 wherein performing image segmentation includes classifying pixels by comparing a color vector of a pixel with classification information to place each pixel in a classification.
8. The method of clause 7 wherein the comparison is performed using a hierarchical classification table.
9. A system comprising:
   a. an acquiring device configured for acquiring an image; and
   b. a processing device configured for performing image segmentation on the image in a color space and brightness space simultaneously.
10. The system of clause 9 wherein the image segmentation is performed using a pixel-wise implementation.
11. The system of clause 9 wherein performing image segmentation utilizes color and brightness of pixels of the image to generate superpixels.
12. The system of clause 9 wherein performing image segmentation includes classifying gray-level pixels as belonging to a gray-level category, and subdividing remaining pixels into sub-categories by using a color triangle which is divided into sectors.
13. The system of clause 12 wherein the color triangle includes 9 divisions, 36 divisions or 15 divisions, and the color triangle is adjusted to human color perception.
14. The system of clause 9 wherein a first subset of the sectors are labeled by brightness and a second subset of sectors are labeled by average color and brightness.
15. The system of clause 9 wherein performing image segmentation includes classifying pixels by comparing a color vector of a pixel with classification information to place each pixel in a classification.
16. The system of clause 15 wherein the comparison is performed using a hierarchical classification table.
17. An apparatus comprising:
   a. an acquisition device for acquiring an image;
   b. a non-transitory memory for storing an application, the application for performing image segmentation on the image in a color space and brightness space simultaneously; and
   c. a processing component coupled to the memory, the processing component configured for processing the application.
18. The apparatus of clause 17 wherein the image segmentation is performed using a pixel-wise implementation.
19. The apparatus of clause 17 wherein performing image segmentation utilizes color and brightness of pixels of the image to generate superpixels.
20. The apparatus of clause 17 wherein performing image segmentation includes classifying gray-level pixels as belonging to a gray-level category, and subdividing remaining pixels into sub-categories by using a color triangle which is divided into sectors.
21. The apparatus of clause 20 wherein the color triangle includes 9 divisions, 36 divisions or 15 divisions, and the color triangle is adjusted to human color perception.
22. The apparatus of clause 17 wherein a first subset of the sectors are labeled by brightness and a second subset of sectors are labeled by average color and brightness.
23. The apparatus of clause 17 wherein performing image segmentation includes classifying pixels by comparing a color vector of a pixel with classification information to place each pixel in a classification.

24. The apparatus of clause 23 wherein the comparison is performed using a hierarchical classification table.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
   a. acquiring an image using a sensor of the device; and
   b. performing image segmentation on the image in a color space and brightness space simultaneously, wherein performing image segmentation includes classifying gray-level pixels as belonging to a gray-level category, and subdividing remaining pixels into sub-categories by using a color triangle which is divided into sectors.

2. The method of claim 1 wherein the image segmentation is performed using a pixel-wise implementation.

3. The method of claim 1 wherein performing image segmentation utilizes color and brightness of pixels of the image to generate superpixels.

4. The method of claim 1 wherein the color triangle includes 9 divisions, 36 divisions or 15 divisions, and the color triangle is adjusted to human color perception.

5. The method of claim 1 wherein a first subset of the sectors are labeled by brightness and a second subset of sectors are labeled by average color and brightness.

6. The method of claim 1 wherein performing image segmentation includes classifying pixels by comparing a color vector of a pixel with classification information to place each pixel in a classification.

7. The method of claim 6 wherein the comparison is performed using a hierarchical classification table.

8. A system comprising:
   a. a sensor in a camera configured for acquiring an image; and
   b. a processor configured for performing image segmentation on the image in a color space and brightness space simultaneously, wherein performing image segmentation includes classifying gray-level pixels as belonging to a gray-level category, and subdividing remaining pixels into sub-categories by using a color triangle which is divided into sectors.

9. The system of claim 8 wherein the image segmentation is performed using a pixel-wise implementation.

10. The system of claim 8 wherein performing image segmentation utilizes color and brightness of pixels of the image to generate superpixels.

11. The system of claim 8 wherein the color triangle includes 9 divisions, 36 divisions or 15 divisions, and the color triangle is adjusted to human color perception.

12. The system of claim 8 wherein a first subset of the sectors are labeled by brightness and a second subset of sectors are labeled by average color and brightness.

13. The system of claim 8 wherein performing image segmentation includes classifying pixels by comparing a color vector of a pixel with classification information to place each pixel in a classification.

14. The system of claim 13 wherein the comparison is performed using a hierarchical classification table.

15. An apparatus comprising:
   a. an acquisition device for acquiring an image;
   b. a non-transitory memory for storing an application, the application for performing image segmentation on the image in a color space and brightness space simultaneously, wherein performing image segmentation includes classifying gray-level pixels as belonging to a gray-level category, and subdividing remaining pixels into sub-categories by using a color triangle which is divided into sectors; and
   c. a processor coupled to the memory, the processor configured for processing the application.

16. The apparatus of claim 15 wherein the image segmentation is performed using a pixel-wise implementation.

17. The apparatus of claim 15 wherein performing image segmentation utilizes color and brightness of pixels of the image to generate superpixels.

18. The apparatus of claim 15 wherein the color triangle includes 9 divisions, 36 divisions or 15 divisions, and the color triangle is adjusted to human color perception.

19. The apparatus of claim 15 wherein a first subset of the sectors are labeled by brightness and a second subset of sectors are labeled by average color and brightness.

20. The apparatus of claim 15 wherein performing image segmentation includes classifying pixels by comparing a color vector of a pixel with classification information to place each pixel in a classification.

21. The apparatus of claim 20 wherein the comparison is performed using a hierarchical classification table.

* * * * *